Oct. 1, 1940

UNITED STATES PATENT OFFICE 2,216,493

ELECTROGRAPHITIC BRUSH

Edwin F. Kiefer, St. Marys, Pa., assignor to Stackpole Carbon Company, St. Marys, Pa., a corporation of Pennsylvania No Drawing. Application April 11, 1939,
Serial No. 267,331

10 Claims. (Cl. 171—325)

This invention relates to electrographitic carbon brushes, and more particularly to those having abrasive or cleaning properties.

The term "electrographitic" is applied to carbon brushes which have been heated in a furnace to a temperature of at least 2250° C. in order to convert the carbon into graphite or pseudo graphite. This high temperature distills from the brush most of the foreign materials therein, such as silica, alumina, and iron oxide, and thereby removes from the brush substantially all of the abrasive materials that are normally present in the usual raw materials used in the manufacture of carbon products. Although this is an advantage when the brush is used in certain applications because it produces a brush that will not wear a commutator appreciably, in a great many instances an electrographitic brush with cleaning or polishing action is desired in order to eliminate the burning which occurs on the commutator segments under certain load conditions, or to remove the heavy commutator films that are produced under varying conditions and cause selective action between brushes.

In order to meet these conditions many attempts have been made to produce abrasive electrographitic brushes by including in their composition materials that would remain in the brushes after the high temperature treatment, such as tungsten, tungsten carbide and tantalum carbide. In general, the brushes produced by this method are not satisfactory, because the added abrasive materials lose their sharpness in some instances, while in others the frictional properties of the brushes are increased to such an extent that the brushes do not function properly on the commutators. The abrasive is not firmly bound to the carbon structure by the carbonaceous binder.

It has also been proposed to add abrasives to the brushes after the high temperature or graphitizing treatment by impregnating them with various salts and decomposing the salts to form oxides, carbides, or reduced metal in the pores of the brushes. For example, silica has been precipitated in the brush pores by impregnating the brush with a silicate and precipitating the silica with an acid solution. The precipitated silica (silica gel) is then dehydrated by heating to about 800° C., whereby hard silica grains ($SiO_2$) are left in the pores of the carbon brush. Or, the carbon and silica may be heated to about 2000° C. to form silicon carbide in the pores. These materials act as abrasives and clean the commutators, but they also cause rapid brush wear.

It is an object of this invention to overcome the above-mentioned disadvantages of such electrographitic brushes to which abrasive have been added either before or after graphitization.

According to one embodiment of this invention, a carbon brush is formed in the usual way from a mixture of finely divided carbon particles and a binder, such as tar or pitch. Such a brush is naturally more or less porous because of the voids between adjoining irregularly shaped carbon particles. To convert the carbon into graphite the brush must be heated in a furnace to graphitizing temperatures, a suitable temperature being at least 2250° C. After such heat treatment the preformed brush is impregnated with an abrasive or abrasive-forming material. Thus, as previously pointed out, the brush may be impregnated with a silicate from which silica is precipitated within the brush pores by a suitable acid. The precipitated silica is then dehydrated by heating at a high temperature to form hard silica grains or silicon carbide. Or, the brush may be impregnated with an organic silicon compound such, for example, as ethyl silicate, after which the brush is dried in the air for several days and then baked to decompose the silicate, suitably at a temperature of at least 600° C. This transforms the ethyl silicate into silica in extremely fine condition in the pores of the graphite. Various other esters or other organo-metallic compounds may also be used, for example, compounds of tin and titanium.

The abrasive-containing brush is then impregnated with a synthetic resin to fill or partially fill the remaining voids in the brush between the abrasive particles and carbon. A suitable heat treatment polymerizes the resin and causes it to firmly cement the abrasive particles in the brush pores.

According to another form of the invention a mixture of carbon particles and abrasive particles that will not distil out at high temperatures, such as tungsten, tungsten carbide, tantalum carbide or titanium carbide, is molded with a binder into a block or body. This block is then heated at graphitizing temperature, after which it is impregnated with a resinous material to firmly bind the abrasive particles to the graphite structure.

A brush made in accordance with this invention has more cleaning action than prior brushes for the same percentage of abrasive, as well as lower friction and longer life. Although the reason why the brushes possess increased cleaning action is not definitely known, I now believe that it is due to the fact that the abrasive particles are cemented in the pores of the carbon, whereby they are held firmly against the commutator as the carbon wears and until the abrasive particles are worn away. When they are not held firmly in place in this manner, as was the condition heretofore, they turn and roll in the pore cavities and are finally pulled across the brush face by the commutator and thrown from the commutator by centrifugal force, wherefore the abrasive action on the commutator is reduced very much and the abrasion or wearing of the brush is increased considerably. This loss of abrasive from the brush face grinds that face and imparts to it a decided mat finish. On the other hand, my brush has a polished face, and its improved action on the surface of the commutator is also apparent. That is, the commutator film is much thinner and its surface is considerably lighter in color. Another advantage is that the resin impregnant supports the abrasive particles in a tough matrix which has sufficient elasticity to absorb shocks imparted to them by the rotating commutator without rupture. This elasticity of the matrix also cushions the abrasive particles sufficiently to prevent them from being shattered or loosened by such impact. Consequently, the abrasive is retained in the carbon or graphite and exerts most of its polishing action on the commutator and not on the face of the brush. As a result of all this, considerable less servicing of commutators is necessary, thereby decreasing maintenance costs.

According to the provisions of the patent statutes, I have explained the principle and method of practicing my invention and have described what I now consider to represent its best embodiments. However, I desire to have it understood that, within the scope of the appended claims, the invention may be practiced otherwise than as specifically described.

I claim:

1. An electrographitic brush comprising a block of graphitized carbon particles and abrasive particles connected together by a binder, and a resinous impregnant firmly cementing said abrasive particles in place in the block.

2. An electrographitic brush comprising a porous block of graphitized carbon particles held together by a binder, an abrasive impregnant in the pores of the block, and a resinous impregnant in said pores cementing said abrasive in place.

3. An electrographitic brush comprising a porous block of graphitized carbon particles held together by a binder, a polymerized resin at least partially filling the pores of the block, and silica particles embedded in said resin by which they are cemented in place in said pores.

4. An electrographitic brush comprising a block of graphitized carbon particles and at least one of the abrasives of the group consisting of tungsten, tungsten carbide, tantalum carbide and titanium carbide, a binder connecting said particles together, and a resinous impregnant firmly cementing said abrasive in place in the block.

5. The method of making an electrographitic brush comprising forming into a porous body, a mixture of carbon particles and a binder and at least one of the abrasives of the group consisting of tungsten, tungsten carbide, tantalum carbide and titanium carbide; heating said body at graphitizing temperature to convert the carbon into graphite; and impregnating the body with a resin to cement said abrasive in place.

6. The method of making an electrographitic brush comprising forming a mixture of finely divided carbon particles and a binder into a porous body, impregnating said body with an abrasive to fill its pores with abrasive particles, and then impregnating the block with a resin to cement said abrasive particles in said pores.

7. The method of making an electrographitic brush comprising forming a mixture of finely divided carbon particles and a binder into a porous body, heating said body at graphitizing temperatures to convert the carbon into graphite, impregnating the body with an abrasive to fill its pores with abrasive particles, and then impregnating the body with a resin to cement said abrasive particles in said pores.

8. The method of making an electrographitic brush comprising forming a mixture of finely divided carbon particles and a binder into a porous body, heating said body at graphitizing temperatures to convert the carbon into graphite, impregnating the body with a silicate to fill its pores with silica particles, and then impregnating the body with a resin to cement said silica particles in said pores.

9. The method of making an electrographitic brush having abrasive characteristics, comprising impregnating a preformed porous body of carbon with an abrasive, and then impregnating said body with a resin to cement said abrasive in the pores of said body.

10. An electrographitic brush comprising a porous block of graphitized carbon particles connected together by a coke binder, abrasive particles in the pores of the block, and an uncarbonized resinous impregnant firmly cementing said abrasive particles in place in the block.

EDWIN F. KIEFER.